March 15, 1966 C. W. VAN RANST 3,240,179
COOLER
Filed Feb. 12, 1964 2 Sheets-Sheet 1

INVENTOR.
CORNELIUS W. VAN RANST
BY
Olsen and Stephenson
ATTORNEYS

March 15, 1966 C. W. VAN RANST 3,240,179
COOLER
Filed Feb. 12, 1964 2 Sheets-Sheet 2

INVENTOR.
CORNELIUS W. VAN RANST
BY
Olsen and Stephenson
ATTORNEYS

United States Patent Office 3,240,179
Patented Mar. 15, 1966

3,240,179
COOLER
Cornelius W. Van Ranst, 15692 Woodland Drive, Dearborn, Mich.
Filed Feb. 12, 1964, Ser. No. 344,351
2 Claims. (Cl. 115—.5)

The present invention relates to coolers adapted to be used with marine vessels to provide cooling for propulsion engines and other auxiliary apparatus requiring cooling liquids.

It is the common practice in the marine industry to use liquid cooling systems for cooling propulsion engines and other auxiliary equipment. In most instances where ocean-going vessels are concerned, an internal fresh water circuit is employed for cooling the engines or equipment, and a companion seawater circuit, including a heat exchanger, is used for removing heat from the fresh water of the fresh water circuit. Liquid cooling systems of this character have certain inherent defects, particularly where small vessels are concerned, and therefore, efforts have been made to develop coolers which serve to eliminate the need for the companion seawater circuit.

One of the results of these efforts has been a cooler which is adapted to be mounted on the external side of the hull below the waterline of the vessel, and the cooler is made a part of the internal fresh water circuit. It is intended that the fresh water in the circuit will have the required amount of heat removed therefrom by heat removing action of the seawater on the external side of the cooler. Under ideal operating conditions such coolers have operated satisfactorily, but it has been found that adverse conditions may arise which render the cooler partially or totally ineffective, causing the vessel to be disabled by reason of overheating of the apparatus which requires cooling. This situation is particularly critical if the marine vessel is for military purposes. Thus, difficulties have arisen in instances where the vessel has been required to move in shallow waters where various forms of debris are present or in waters where seaweed, or the like, are present.

It is an object of the present invention to provide an improved cooler for use with a marine vessel, which cooler is constructed and arranged so that it will provide optimum cooling under various conditions of operation of the marine vessel.

It is still another object of the present invention to provide a cooler of the foregoing character which is also characterized by its manner of construction, enabling it to be economically produced.

It is still another object of the present invention to provide a cooler of the foregoing character which provides relatively large effective heat exchange areas in proportion to the size of the complete unit, and which has flow characteristics on both internal and external surfaces to provide a highly efficient heat exchange unit.

It is still another object of the present invention to provide a cooler which is characterized by the absence of flow obstructing portions outboard of the skin of the vessel.

Other objects of this invention will appear in the following description and appended claims, reference being had to the accompanying drawings forming a part of this specification wherein like reference characters designate corresponding parts in the several views.

Figure 1:
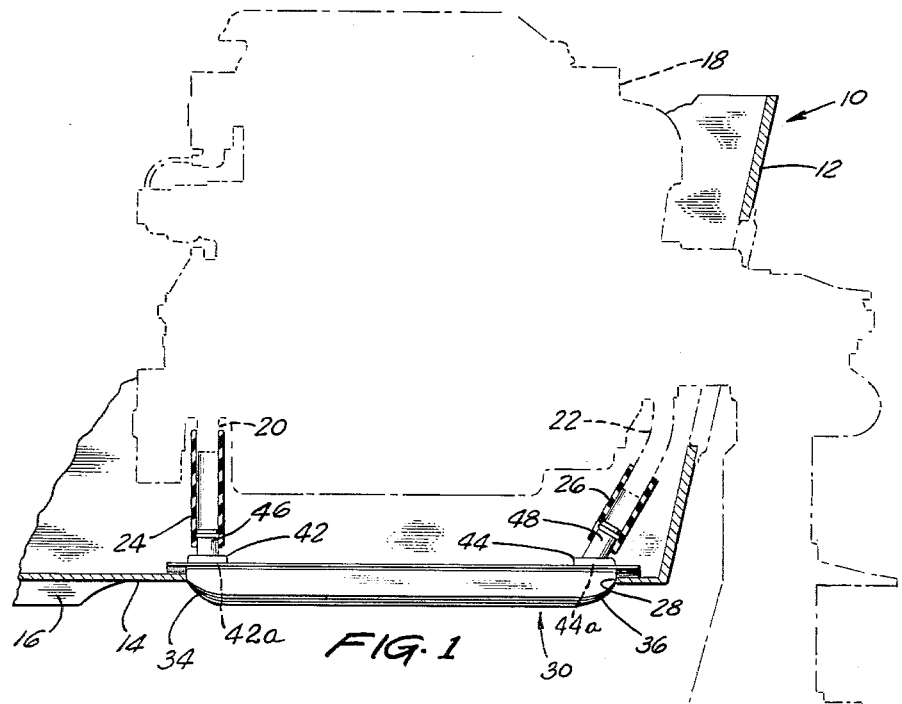
FIGURE 1 is a fragmentary vertical section taken along the keel of a marine vessel showing a propulsion engine in broken lines and showing the side elevation of a cooler embodying the present invention.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring now to the drawings, the invention will be described in greater detail. The marine vessel 10 has a hull with a stern or transom 12 and a generally flat bottom or skin 14 along which extends the keel 16. Mounted within the vessel 10 is the internal combustion engine 18 adapted to function as the propulsion engine. The engine 18 has a conventional fresh water cooling system with inlet and outlet hose fittings 20 and 22 to which are connected, respectively, the hoses 24 and 26. The bottom or skin 14 has an opening 28 therein which is closed by the cooler 30 which is fitted thereinto.

The illustrated embodiment of the invention is formed from a plurality of sections of stainless steel sheet material, which sections are joined together into an integral structure by suitable means, such as welding. The specific shapes of each of the various sections will not be discussed in detail, because it will be apparent to those skilled in the art that the cooler can be fabricated in various ways and still arrive at the same configuration that is disclosed in the drawings.

Figure 4:
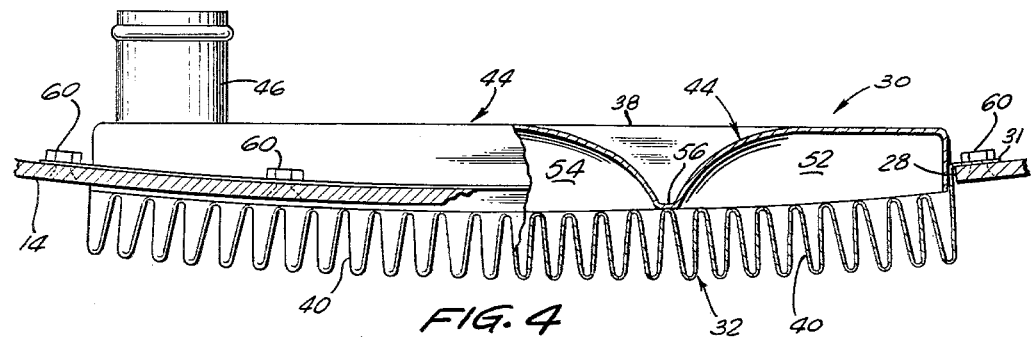
FIGURE 4 is a sectional view taken on the line 4—4 of FIGURE 3.

The cooler 30 has a bottom or outer sheet portion 32 which has a transverse sinuous configuration, as seen best in FIGURE 4, and the bottom or outer sheet portion 32 curves upwardly in streamlined fashion at its opposite ends 34 and 36. Between opposite ends 34 and 36 and located on the top inner surface of the sheet portion 32 is another sheet portion 38 which closes the spaces between the top or innermost ends of the convolutions in sheet portion 32, thereby defining a plurality of closed, parallel spaced tubes 40 extending fore and aft in the cooler 30 between the opposite ends 34 and 36. The tubes 40 open at their opposite ends 34 and 36, respectively, into headers 42 and 44 which have their respective openings 42a and 44a (FIGS. 1 and 2) disposed in a common plane and which hose fittings 46 and 48 extending upwardly therefrom and to which the hoses 24 and 26 are adapted to be connected. Thus, water, or other liquid coolants can flow into one header 42 or 44, through one of the openings 42a or 44a, through the tubes 40 and out the other header 42 or 44 through the other opening 42a or 44a. The headers 42 and 44 can be constructed to determine the number of passes the water makes between the headers before exiting from the cooler 30.

The perimetrical parts of the bottom or outer sheet portion 32 are extended outwardly of the tube convolutions 40 to form a flange 31 for fastening the cooler unit in the hull opening 28. As clearly shown in FIG. 4, this perimetrical flange 31 is disposed above the plane of the sheet portion 38 substantially equal to the thickness of the hull bottom 14. Thus, when the cooler unit 30 is set in the hull-bottom opening 28 the upper or inner ends of the tube convolutions 40 are disposed substantially in the plane of the skin bottom 14. Hence, the entire mid-portions of all of the tubes 40 are disposed entirely below the plane of the respective openings 42a and 44a to the headers.

Figure 3:
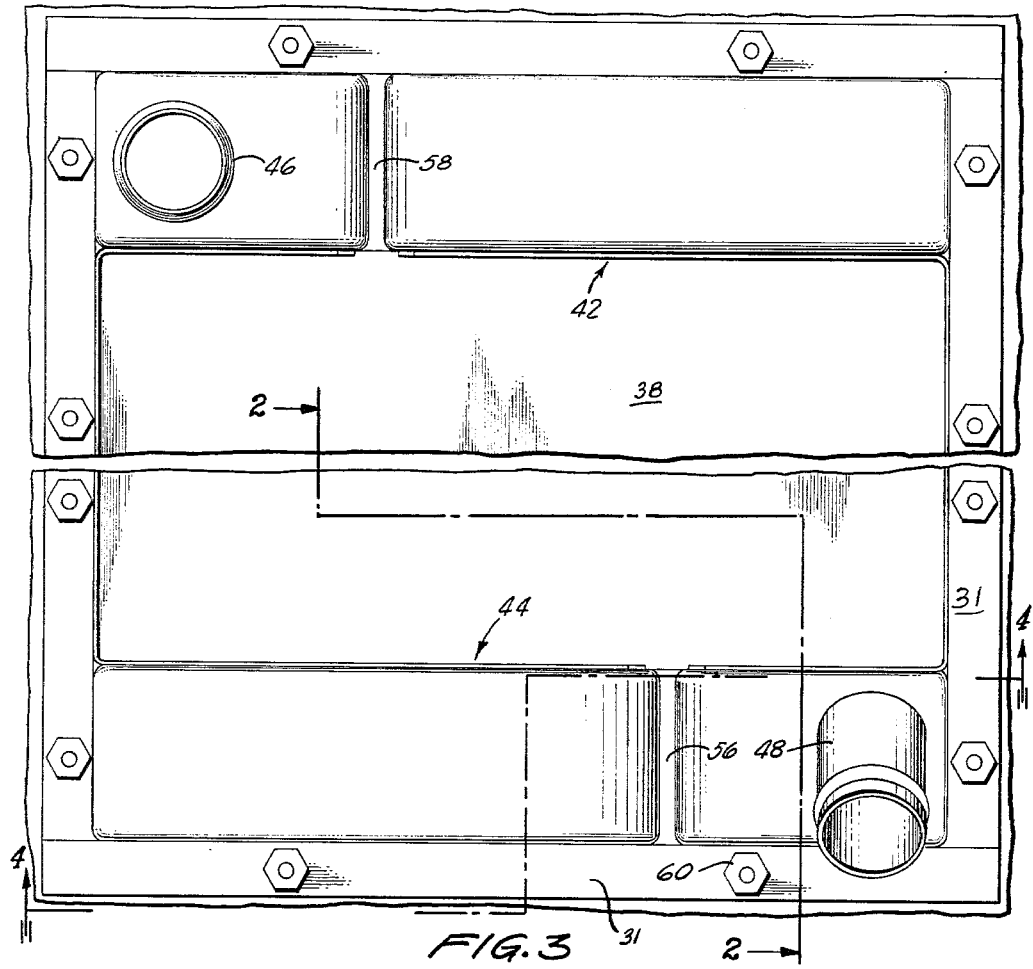
FIGURE 3 is an enlarged fragmentary top plan view of the cooler, with the midportion removed.

The disclosed embodiment is constructed and arranged so that the water flowing between the hose fittings 46 and 48 will make three passes through the tubes 40 before leaving the cooler 30. This is accomplished by a partition arrangement provided in each of headers 42 and 44. As shown in FIGURES 3 and 4, the header 44 has a pair of compartments 52 and 54 which are separated by the top wall being connected at 56 to one of the top or innermost convolutions of sheet portion 32. Similarly, the header 42 has its top wall connected at 58 to another of the top or innermost convolutions of sheet portion 32. By virtue of this arrangement, a liquid entering header 44 through hose fitting 48 will initially travel lengthwise through the group of tubes 40 comprising the nine tubes in the right of FIGURE 4 then transversely across the compartment in header 42 which terminates at the connection 58, after which the liquid will travel lengthwise through the group of tubes 40 comprising the nine tubes in the center of FIGURE 4, then transversely across compartment 54, and then once more in the lengthwise direction through the group of tubes 40 comprising the nine tubes in the left of FIGURE 4 and to header 42 and out hose fitting 46.

Figure 2:
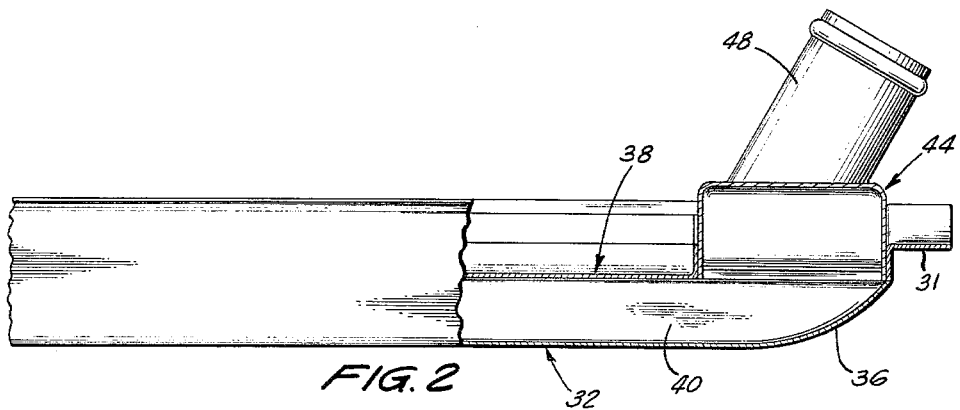
FIGURE 2 is an enlarged fragmentary side elevation, partially in section, showing one end of the cooler.

As can be seen best in FIGURES 1, 2 and 4, only the tube portions 40 of the cooler 30 project outwardly from the skin 14 of the vessel 10, and the fore and aft ends of such tubes 40 are streamlined and merge into the skin 14 so that debris, weeds and the like, will not readily adhere to the tubes to interfere with the heat transfer from the liquid within the tubes 40 to the ambient water. Thus, the maximum heat transfer relationship is established and minimum opportunity is provided for interfering with the flow across the tubes 40 of the ambient cooling water.

It is also to be observed that the optimum flow characteristics of the fresh water within cooler 30 is provided so that maximum cooling efficiency is realized. It is to be noted that a smooth flow path exists from the tubes outside the skin of the ship back to the headers which are within the confines of the skin of the vessel.

The fabricated cooler 30 is secured at its peripheral edge to the hull of the vessel 10 by suitable means, such as the plurality of screws shown at 60. Thus, the cooler 30 forms, in effect, a closure in the hull of the vessel 10.

Figure 5:
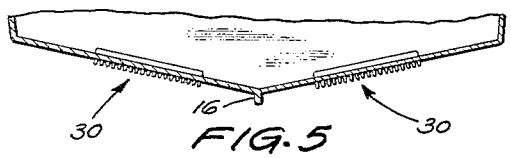
FIGURE 5 is a reduced transverse section through the bottom portion of another marine vessel, showing an arrangement whereby two coolers are mounted in the vessel.

The cooler 30 is shown located adjacent to the stern of the vessel 10 in alignment with the keel 16. If desired, additional coolers may also be located on opposite sides of the keel 16, as is shown, by way of example, in FIGURE 5. Thus, separate coolers can be used for cooling purposes in connection with a plurality of pieces of apparatus.

Having thus described my invention, I claim:

1. A marine vessel having a hull opening in the bottom thereof below the water line, a cooler comprising an outer sheet portion of sinuous configuration forming a series of parallel tube convolutions between opposite perimeters thereof, a pair of headers disposed transversely along the opposite perimeters of the outer sheet portion and having bottom openings communicating with the adjacent ends of the respective tube-forming convolutions, another sheet portion superimposed on the lower sheet portion between the headers and closing the innermost ends of the series of tube-forming convolutions, means fixed at diagonally opposite ends of the respective headers for communication with a fluid cooling system, each of the headers having a wall portion connected to one of the convolutions of the lower-sheet portion to transversely partition the header in two compartments, an outwardly-extending flange integrated with the outer sheet portion and disposed in a plane above the inner ends of the tube-forming convolutions and extending entirely around the perimeter of outer sheet portion, the unit being set in the hull opening with the flange secured to the hull to dispose the tube-forming convolutions entirely below the skin of the vessel bottom.

2. A cooler comprising an outer sheet portion of sinuous configuration forming a series of parallel tube convolutions between opposite perimeters thereof, a pair of headers disposed transversely along the opposite perimeters of the outer sheet portion and having bottom openings communicating with the adjacent ends of the respective tube-forming convolutions, another sheet portion superimposed on the lower sheet portion between the headers and closing the innermost ends of the series of tube-forming convolutions, means fixed at diagonally opposite ends of the respective headers for communication with a fluid cooling system, and each of the headers having a wall top portion connected to one of the convolutions of the lower sheet portion adjacently inward from the respective bottom opening by an inwardly curved portion of the top wall of the respective header to transversely partition the header into two compartments.

References Cited by the Examiner

UNITED STATES PATENTS

| | | | |
|---|---|---|---|
| 1,511,691 | 10/1924 | Valk | 165—44 X |
| 2,415,154 | 2/1947 | Walter | 115—0.5 X |
| 2,382,218 | 8/1945 | Fernstrum | 115—0.5 |

MILTON BUCHLER, *Primary Examiner.*

ANDREW H. FARRELL, *Examiner.*